(12) United States Patent
Angkititrakul et al.

(10) Patent No.: US 11,170,760 B2
(45) Date of Patent: Nov. 9, 2021

(54) DETECTING SPEECH ACTIVITY IN REAL-TIME IN AUDIO SIGNAL

(71) Applicant: Robert Bosch GmbH, Stuttgart (DE)

(72) Inventors: Pongtep Angkititrakul, Union City, CA (US); HyeongSik Kim, San Jose, CA (US)

(73) Assignee: Robert Bosch GmbH, Stuttgart (DE)

( * ) Notice: Subject to any disclaimer, the term of this patent is extended or adjusted under 35 U.S.C. 154(b) by 154 days.

(21) Appl. No.: 16/448,710

(22) Filed: Jun. 21, 2019

(65) Prior Publication Data

US 2020/0402499 A1    Dec. 24, 2020

(51) Int. Cl.
  *G10L 15/22*    (2006.01)
  *G10L 15/05*    (2013.01)
  *G10L 25/84*    (2013.01)

(52) U.S. Cl.
  CPC .............. *G10L 15/05* (2013.01); *G10L 15/22* (2013.01); *G10L 25/84* (2013.01)

(58) Field of Classification Search
  CPC ..... G10L 25/78; G10L 21/0208; G10L 15/20; G10L 2021/02166; G10L 21/028; G10L 15/187; G10L 15/22; G10L 15/26; G10L 15/30; G10L 15/32; G10L 21/0264; G10L 21/0272; G10L 15/05; G10L 25/84; H04M 3/568; H04M 2201/14; H04M 3/18; H04M 3/4936; H04M 3/56; H04L 65/403; H04L 65/605
  USPC ....... 704/226–228, 233, 200, 204, 213, 215, 704/225, 240, 253; 379/406.02, 202.01; 381/92, 111, 71.6, 71.8
  See application file for complete search history.

(56) References Cited

U.S. PATENT DOCUMENTS

| | | | |
|---|---|---|---|
| 5,826,230 A | 10/1998 | Reaves | |
| 6,405,168 B1 | 6/2002 | Bayya et al. | |
| 6,597,787 B1* | 7/2003 | Lindgren | H04B 3/21 379/406.01 |
| 6,600,874 B1 | 7/2003 | Fujita et al. | |
| 6,782,363 B2 | 8/2004 | Lee et al. | |
| 7,412,376 B2 | 8/2008 | Florencio et al. | |
| 7,596,496 B2* | 9/2009 | Jabloun | G10L 25/78 704/226 |
| 7,970,564 B2* | 6/2011 | Wang | G06K 9/6243 702/66 |
| 8,046,215 B2* | 10/2011 | Cho | G10L 25/78 704/215 |

(Continued)

*Primary Examiner* — Vijay B Chawan
(74) *Attorney, Agent, or Firm* — Michael Best & Friedrich LLP

(57) ABSTRACT

Systems and methods for detecting speech activity. The system includes an audio source and an electronic processor. The electronic processor is configured to receive a first audio signal from the audio source, buffer the first audio signal, add random noise to the buffered first audio signal, and filter the first audio stream to create a filtered signal. The electronic processor then determines a signal entropy of each frame of the filtered signal, determines an average signal entropy of a first plurality of frames of the filtered signal occurring at a beginning of the filtered signal, and compares the signal entropy of each frame of the filtered signal to the average signal entropy. Based on the comparison, the electronic processor determines a first speech endpoint located in a first frame of the filtered signal.

20 Claims, 3 Drawing Sheets

(56) References Cited

U.S. PATENT DOCUMENTS

| | | | | |
|---|---|---|---|---|
| 8,223,988 | B2* | 7/2012 | Wang | G10L 21/028 |
| | | | | 381/92 |
| 8,606,573 | B2* | 12/2013 | Konchitsky | G10L 15/20 |
| | | | | 704/233 |
| 8,762,150 | B2 | 6/2014 | Edgington et al. | |
| 9,159,320 | B2 | 10/2015 | Hyun et al. | |
| 9,237,238 | B2* | 1/2016 | Chu | H04M 3/568 |
| 9,418,675 | B2* | 8/2016 | Zhu | G10L 21/0208 |
| 9,536,523 | B2 | 1/2017 | Bakish et al. | |
| 10,237,412 | B2* | 3/2019 | Pilli | H04L 65/403 |
| 10,573,312 | B1* | 2/2020 | Thomson | G10L 15/30 |
| 2002/0064139 | A1* | 5/2002 | Bist | H04B 3/23 |
| | | | | 370/289 |
| 2003/0216909 | A1 | 11/2003 | Davis et al. | |
| 2004/0064314 | A1* | 4/2004 | Aubert | G10L 25/87 |
| | | | | 704/233 |
| 2004/0078199 | A1* | 4/2004 | Kremer | G10L 21/0208 |
| | | | | 704/233 |
| 2006/0253283 | A1* | 11/2006 | Jabloun | G10L 25/78 |
| | | | | 704/233 |
| 2009/0125304 | A1* | 5/2009 | Cho | G10L 25/78 |
| | | | | 704/233 |
| 2009/0190774 | A1* | 7/2009 | Wang | H04R 3/005 |
| | | | | 381/92 |
| 2013/0060567 | A1* | 3/2013 | Konchitsky | H04M 3/4936 |
| | | | | 704/233 |
| 2013/0325475 | A1 | 12/2013 | Chung et al. | |
| 2014/0081631 | A1* | 3/2014 | Zhu | G10L 21/0208 |
| | | | | 704/226 |
| 2015/0030149 | A1* | 1/2015 | Chu | H04M 3/568 |
| | | | | 379/202.01 |
| 2015/0304502 | A1* | 10/2015 | Pilli | H04W 4/06 |
| | | | | 455/416 |

* cited by examiner

DETECTING SPEECH ACTIVITY IN REAL-TIME IN AUDIO SIGNAL

BACKGROUND

Speech activity detection is an important component in systems that rely on speech signals, especially interactive speech systems such as automatic speech recognition systems, speech recording systems, automatic message detection systems, mobile communication technology, and others. State-of-the-art systems utilize features such as energy, zero-crossing, and frequency spectrum to ascertain speech in audio signals. Some advanced systems employ pre-trained models to distinguish between speech and non-speech frames in audio signals. However, the performance of state-of-the-art systems for endpoint detection can vary significantly depending on characteristics of non-speech or background noises of received audio signals.

SUMMARY

The current invention describes a light-weight method and system to robustly detect beginning and end points of speech in real-time in an audio signal. The background audio environment is observed from a short audio segment at the beginning of the audio signal and then speech and non-speech portions of the audio signal are determined based upon calculated entropy statistics of the audio signal frequency spectrum. The beginning and ending points of active speech are then determined based upon entropy statistics accumulated from the determined speech and non-speech portions of the audio signal.

One embodiment provides a system for automatically detecting beginning and ending points of speech in an audio signal. The system includes an audio source and an electronic processor. The electronic processor is configured to receive a first audio signal from the audio source, buffer the first audio signal, add random noise to the buffered first audio signal, and filter the first audio stream to create a filtered signal. The electronic processor then determines a signal entropy of each frame of the filtered signal, determines an average signal entropy of a first plurality of frames of the filtered signal occurring at a beginning of the filtered signal, and compares the signal entropy of each frame of the filtered signal to the average signal entropy. Based on the comparison, the electronic processor determines a first speech endpoint located in a first frame of the filtered signal.

Another embodiment provides a method for automatically detecting beginning and ending points of speech in an audio signal. The method includes receiving, via an electronic processor, a first audio signal from an audio source; buffering, via the electronic processor, the first audio signal; and adding, via the electronic processor, random noise to the buffered first audio signal. The method also includes filtering, via the electronic processor, the first audio stream to create a filtered signal; determining, via the electronic processor, a signal entropy of each frame of the filtered signal; and determining, via the electronic processor, an average signal of a first plurality of frames of the filtered signal, where the first plurality of frames occur at a beginning of the filtered signal. The method also includes comparing, via the electronic processor, the signal entropy of each frame of the filtered signal to the average signal entropy; and determining, via the electronic processor, a first speech endpoint located in a first frame of the filtered signal based upon the comparison.

These and other features, aspects, and advantages will be apparent from a reading of the following detailed description and a review of the associated drawings. It is to be understood that both the foregoing general description and the following detailed description are explanatory and do not restrict aspects as claimed.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Figure 1:
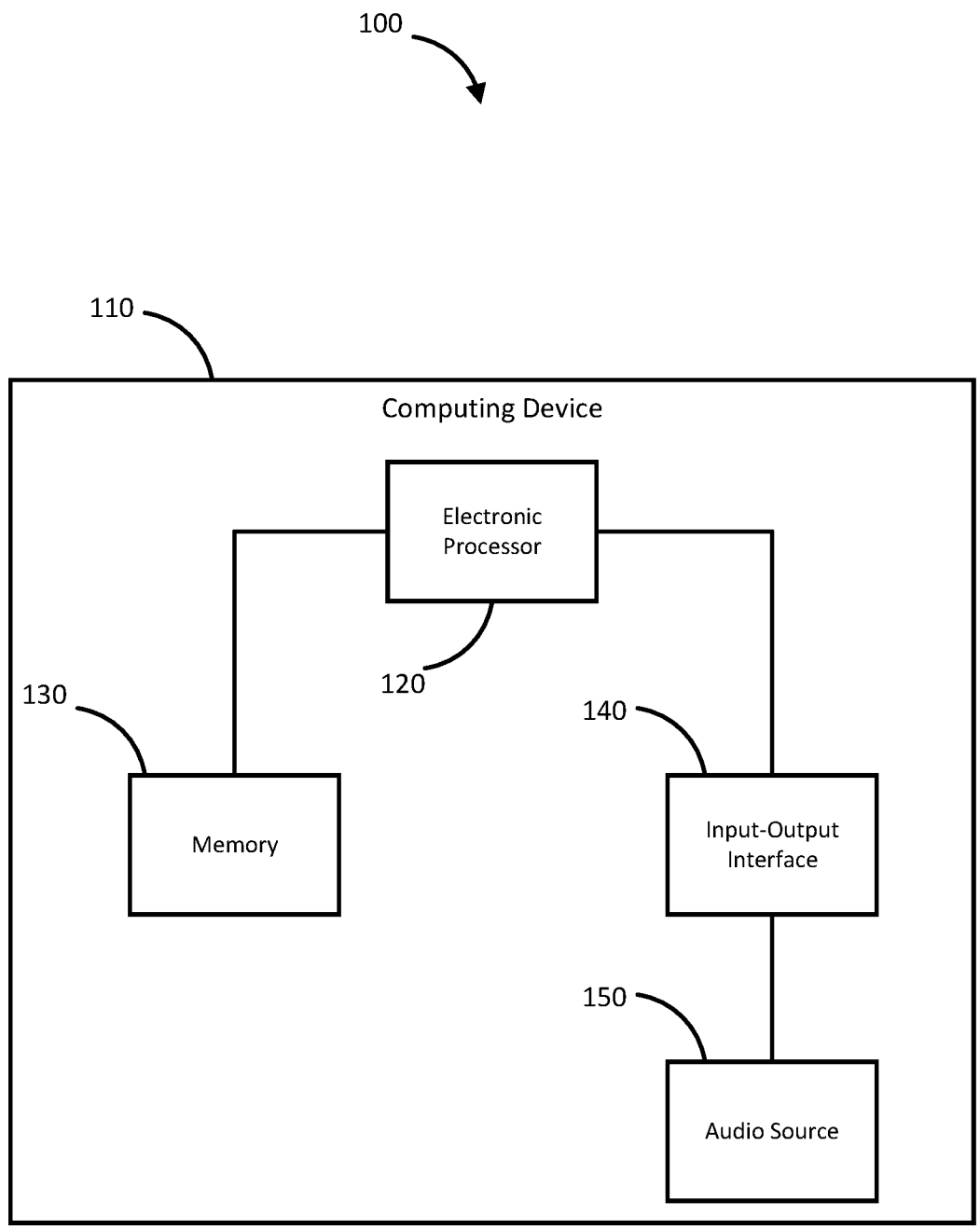
FIG. 1 illustrates a system for detecting speech endpoints in real time in an audio signal according to one embodiment.

FIG. 1 illustrates a system 100 for detecting speech endpoints in real time in an audio signal according to one embodiment. The system 100 includes a computing device 110, such as a smartphone, desktop computer, laptop computer, smart wearable, server, or other computing device.

The computing device 110 includes a plurality of electrical and electronic components that provide power, operation control, and protection to the components and modules within the computing device 110. As illustrated in FIG. 1, the computing device 110 includes an electronic processor 120, memory 130, and an input-output interface 140. The electronic processor 120 may be a programmable electronic microprocessor, a microcontroller, an application-specific integrated circuit ("ASIC"), and the like. The electronic processor 120 is electronically coupled to the memory 130 and the input-output interface 140. The memory 130 is a non-transitory, computer-readable memory, such as random access memory ("RAM"), electrically erasable programmable read-only memory ("EEPROM"), and the like. The input-output interface 140 allows external electronic components to communicate with the electronic processor 120.

The computing device 110 may utilize several electronic processors each configured to perform specific functions or sub-functions. Additionally, the computing device 110 may contain sub-modules that include electronic processors, memory, or ASICs for handling input-output functions, processing of signals, and application of the methods listed below. In other embodiments, the computing device 110 includes additional, fewer, or different components.

The computing device 150 also includes an audio source 150. In general, the audio source 150 provides an audio signal (analog or digital) to the electronic processor 120 for analysis. In some embodiments, the audio source 150 is a microphone or some other sound-gathering apparatus for use in an environment. In other embodiments, the audio source 150 may be a memory or other storage from which audio signals may be retrieved. In these embodiments, the audio source 150 is configured to provide the retrieved audio signal to the electronic processor 120 for processing.

Figure 2:
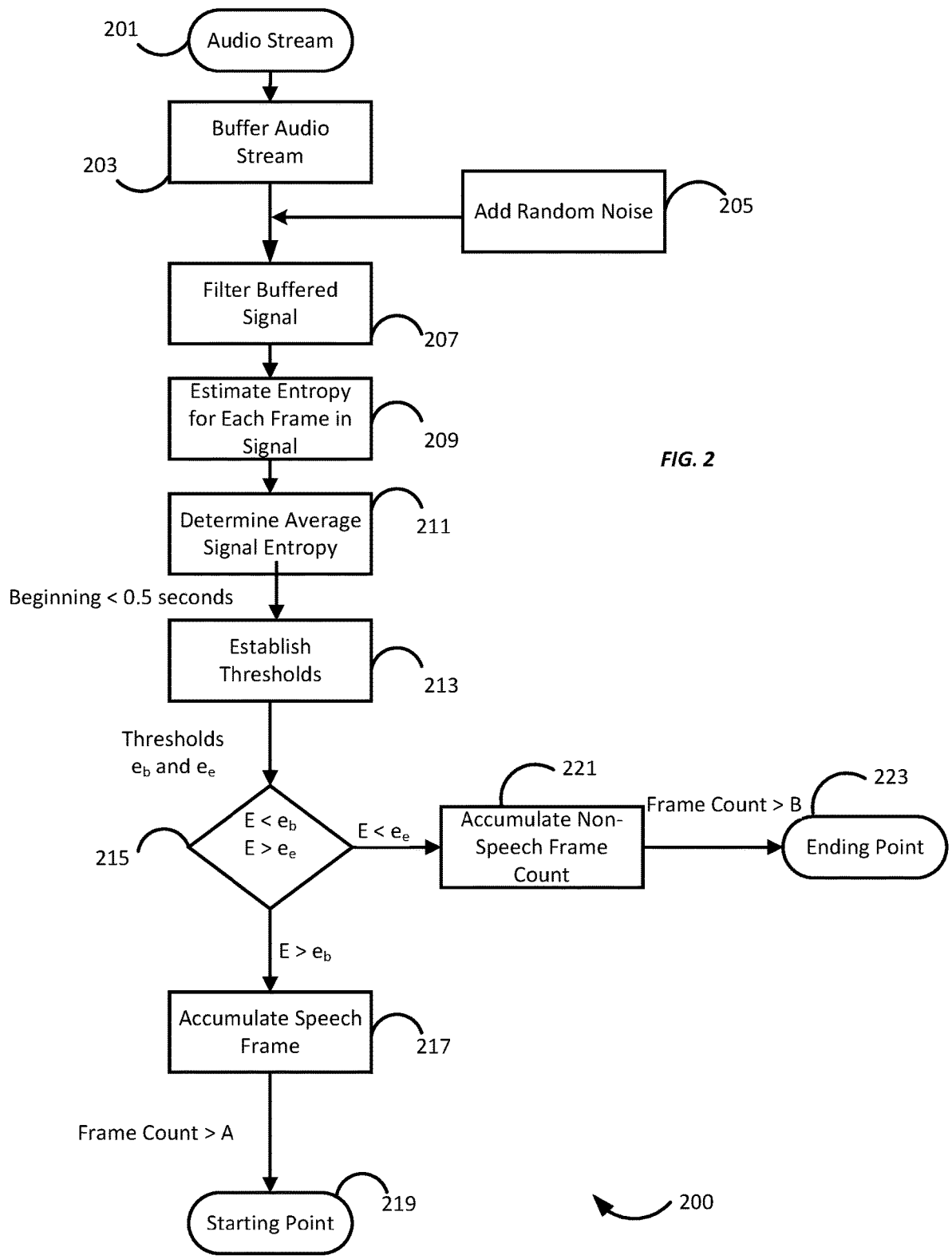
FIG. 2 illustrates a block diagram of a method for detecting speech endpoints in an audio signal according to one embodiment.

FIG. 2 illustrates a block diagram of a method 200 for detecting speech endpoints in an audio signal according to one embodiment. The method 200 includes buffering, with the electronic processor 120, an audio signal 201 (at block 203). The audio signal 201 is placed into a temporary audio buffer to sequentially store the audio signal 201 for later processing and for detecting speech endpoints as described below. The temporary audio buffer is a portion of the memory 130 dedicated to holding the audio signal 201 for processing. After buffering, the audio signal 201 may be divided into a plurality of frames using frame-based signal processing.

The method 200 also includes adding, with the electronic processor 120, random noise to the audio signal 201 once the audio signal 201 has been buffered (at block 205). By adding random noise to the audio signal 201, a baseline of noise is established in the signal, removing the drawbacks of determining thresholds at different frequency and noise levels. The characteristics of the background noise are also added to the existing audio signal to aid in filtering and entropy estimation as described below.

Next, the buffered audio signal 201 is filtered via the electronic processor 120 (at block 207). By filtering the audio signal 201, frequencies outside of human speech are removed from the audio signal 201. As a consequence, extra sounds, such as electronic noises, natural noise, and others are not processed and misidentified as human speech. In some embodiments, in order to remove both very high and very low frequencies, a band-limited filter is utilized. A band-limited filter filters both very high and very low frequencies simultaneously. For example, the band-limited filter applied to the audio signal 201 may have a lower limit of 250 Hertz (e.g., filtering out all frequencies below 250 Hertz) and also have an upper limit of 6000 Hertz (e.g., filtering out all frequencies above 6000 Hertz) in order to capture the usable voice frequency band.

The method 200 also includes estimating, with the electronic processor 120, an entropy statistic of each frame of the audio signal 201 (at block 209). The entropy of each frame of the audio signal 201 is defined by the equation $$H(|Y(w,t)|^2) = -\Sigma_{w=1}^{\Omega} P(|Y(w,t)|^2) \log(P(|Y(w,t)|^2)) \qquad \text{Equation 1}$$

In Equation 1, $$P(|Y(w,t)|^2) = \frac{|Y(w,t)|^2}{\sum_{w=1}^{\Omega} |Y(w,t)|^2},$$

and is a probability of the frequency band w of a magnitude spectrum at frame t. |Y(w,t)| is the magnitude spectrum of the frame t being analyzed. Once the entropy of each frame is estimated, each calculated entropy undergoes smoothing, which is done by performing auto-regression on the calculated entropy of each frame.

The signal spectrum of human speech is more structural than non-speech or random noise. Therefore, it is possible to use the calculated entropy of the frames to distinguish between speech and non-speech segments of the audio signal 201.

In order to distinguish speech from non-speech in the audio signal 201, the electronic processor 120 first determines an average signal entropy ($e_{nt}$) (at block 211). The average signal entropy is determined by averaging the signal entropy of a predetermined number of frames or predetermined signal length from the beginning of the audio signal 201. For example, the electronic processor 120 may average the signal entropies from every frame for the first half second (0.5 seconds) of the audio signal 201. By calculating the average entropy of the beginning of the audio signal 201, the current acoustic environment (e.g., the average entropy of the signal while no speech is present) can be determined and compared to entropies of later frames to identify when speech begins. In addition, by only utilizing a short duration of the signal, computational overhead can be reduced.

Once the average signal entropy is calculated, the electronic processor 120 calculates an onset threshold ($e_b$) and an offset threshold ($e_e$) based upon the average signal entropy (at block 213). The onset threshold is calculated by multiplying the average signal entropy by a weight factor and then adding this value to the average signal entropy. The calculation for the onset threshold is illustrated in Equation 2.

$$e_b = e_{nt} + \delta * e_{nt} \qquad \text{Equation 2}$$

The offset threshold is calculated by multiplying the average signal entropy by a weight factor and then subtracting this value from the average signal entropy. The calculation for the offset threshold is illustrated in Equation 3.

$$e_e = e_{nt} - \delta * e_{nt} \qquad \text{Equation 3}$$

The weight factor is, in some embodiments, a small weight factor (e.g., 0.1-0.3). By making the weight factor a small value, frames of the audio signal 201 containing speech can be accurately determined while still allowing for variance in the human voices being captured in the audio signal 201. In some embodiments, the weight factor used to calculate the onset threshold and the weight factor used to calculate the offset threshold have the same value. In other embodiments, the two weight factors may have different values. The weight parameter may be tunable by a user of the system 100 or may be a static value.

Once the onset threshold and offset threshold are calculated, the electronic processor 120 compares the entropy (E) of each frame of the audio signal 201 to the onset threshold and offset threshold (at block 215). If the entropy of the frame being analyzed is between the two thresholds, no action is taken, and the electronic processor 120 continues to analyze the next frame of the audio signal 120.

If the entropy of the frame being analyzed is above the onset threshold, a speech frame counter is incremented and a speech frame is accumulated (at block 217). After a minimum number of speech frames are accumulated, a speech start point 219 is determined. The minimum number of speech frames necessary to determine that speech has started is defined by a minimum speech frame threshold A. Once the number of speech frames is above the minimum speech frame threshold A, a first frame of the number of speech frames is identified as the speech start point 219. The first frame of the number of speech frames is stored in the memory 130 and is accessible by the electronic processor 120 for future access.

The minimum speech frame threshold A may be adjustable by a user of the system 100 or may be a predefined value. In some embodiments, based upon the length of the audio signal 201, the electronic processor 120 may determine the minimum speech frame threshold A.

In some embodiments, the first frame that can be identified as the speech start point 219 must occur after the first plurality of frames that were analyzed at block 211, as this first plurality of frames was used to establish the average signal entropy of the audio signal 201 and represents the average background noise in the audio signal 201. This accounts for the audio signal 201 being representative, for example, of a human speaking in a loud environment.

The number of accumulated speech frames is not reset if a frame after the first frame has an entropy below the onset threshold. This allows for small breaks that occur naturally in human speech, such as pauses for breathing, annunciation, and other normal breaks in human speech.

If the frame being analyzed has an entropy below the offset threshold, a non-speech frame is accumulated (at block 221). Much like accumulating a speech frame, when non-speech frame is determined, a non-speech frame counter is incremented. After a minimum number of non-speech frames are accumulated, a speech end point 223 is determined. The minimum number of non-speech frames necessary to determine that speech has ended is defined by a minimum non-speech frame threshold B. Once the number of non-speech frames is above the minimum non-speech frame threshold B, a first frame of the number of non-speech frames is identified as the speech end point 223. The first frame of the number of non-speech frames is stored in the memory 130 and is accessible by the electronic processor 120 for future access.

After the speech start point 219 is detected and stored, the electronic processor 120 is configured to reset the number of accumulated non-speech frames to 0. This allows for any non-speech frames accumulated before the speech start point 219 or any non-speech frames identified after the first frame of the number of speech frames to be cleared and the speech end point 223 to be accurately identified. After the speech start point 219 is detected and stored, the electronic processor 120 returns to analyzing the frames of the audio signal 201

The first frame of the non-speech frames (the speech end point 223) occurs after the first frame of the speech frames (the speech start point 219), and may also be referred to as a second frame for purposes of illustration.

Figure 3:
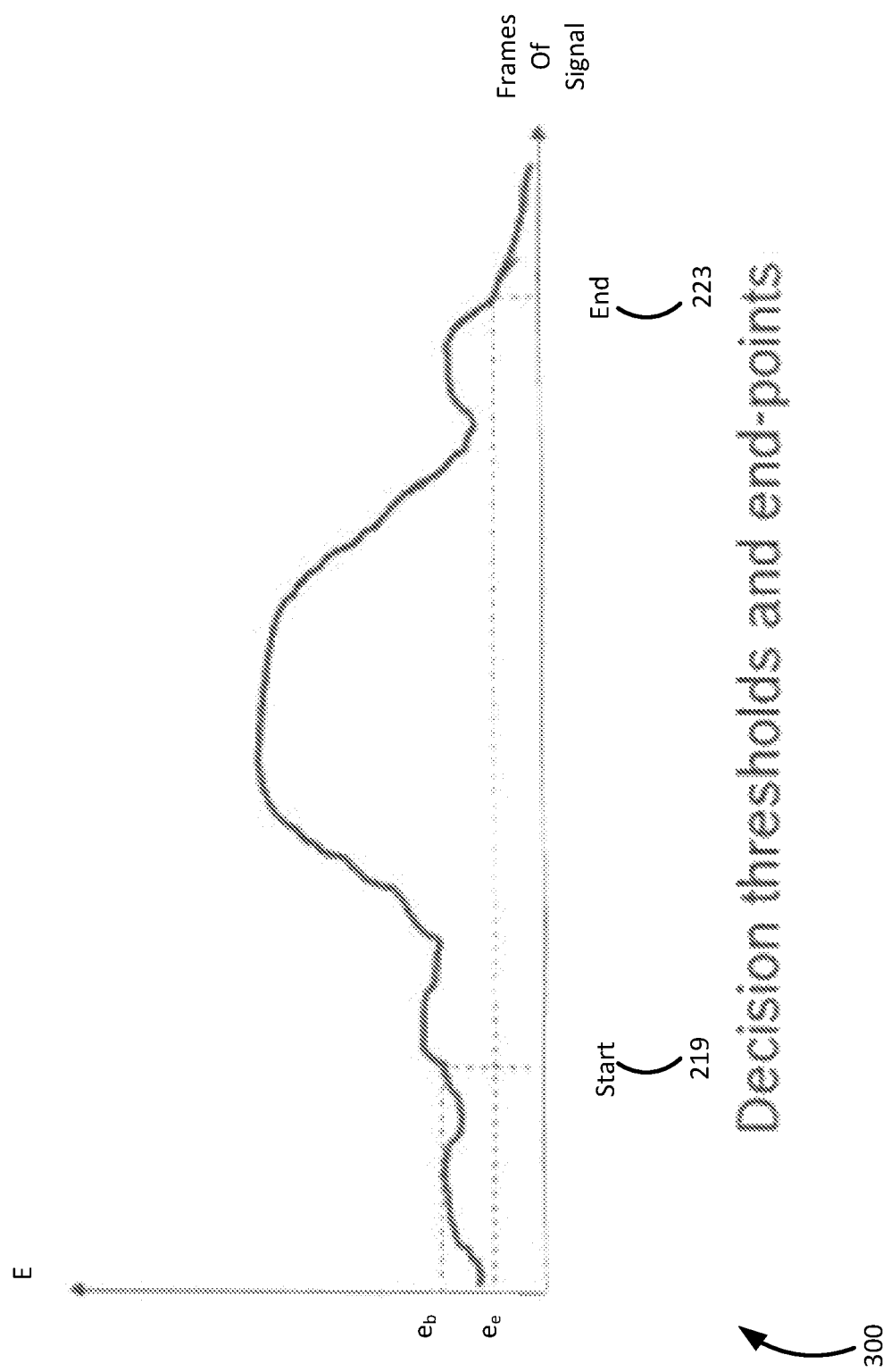
FIG. 3 is a graph illustrating onset and offset thresholds of speech and start and end points of speech according to one embodiment.

FIG. 3 is a graph 300 illustrating how the speech start point 219 and the speech end point 223 are detected. As described with reference to FIG. 2, the onset threshold $e_b$ and the offset threshold $e_e$ are calculated and then the entropy E of each of the frames of the audio signal 201 are compared to the thresholds. After a certain number of frames occur above the onset threshold, the speech start point 219 is determined. While the entropy of the frames after the speech start point 219 is above the onset threshold, speech is still detected. Once the entropy of the frames fall below the offset threshold for a predetermined number of frames, the speech end point 223 is detected.

Thus, embodiments described herein provide, among other things, systems and methods for detecting speech endpoints in an audio signal. Various features, advantages, and embodiments are set forth in the following claims.

What is claimed is:

1. A system for automatically detecting speech endpoints in an audio signal, the system comprising:
   an audio source; and
   an electronic processor configured to
      receive a first audio signal from the audio source;
      buffer the first audio signal;
      add random noise to the buffered first audio signal;
      filter the first audio signal to create a filtered signal;
      determine a signal entropy of each frame of the filtered signal;
      determine an average signal entropy of a first plurality of frames of the filtered signal, the first plurality of frames occurring at a beginning of the filtered signal;
      compare the signal entropy of each frame of the filtered signal to the average signal entropy; and
      determine a first speech endpoint located in a first frame of the filtered signal based upon the comparison.

2. The system of claim 1, wherein the first audio signal is filtered using a band-limited filter.

3. The system of claim 2, wherein the band-limited filter has a lower limit of 250 Hertz and an upper limit of 6000 Hertz.

4. The system of claim 1, wherein the first frame occurs after the first plurality of frames of the filtered signal.

5. The system of claim 1, wherein the electronic processor is further configured to determine a second speech endpoint in a second frame of the filtered signal, the second frame occurring later in the filtered signal than the first frame.

6. The system of claim 5, wherein the first speech endpoint is a beginning point of speech and the second speech endpoint is an ending point of speech.

7. The system of claim 5, wherein the second speech endpoint is determined when a predetermined number of frames after the second frame have a signal entropy below an offset threshold.

8. The system of claim 7, wherein the offset threshold is determined based upon the average signal entropy and a weight parameter.

9. The system of claim 1, wherein the first speech endpoint is determined when a predetermined number of frames after the first frame have a signal entropy greater than an onset threshold.

10. The system of claim 9, wherein the onset threshold is determined based upon the average signal entropy and a weight parameter.

11. A method of for automatically detecting speech endpoints in an audio signal, the method comprising:
 receiving, by an electronic processor, a first audio signal from an audio source;
 buffering, via the electronic processor, the first audio signal;
 adding, via the electronic processor, random noise to the buffered first audio signal;
 filtering, via the electronic processor, the first audio signal to create a filtered signal;
 determining, via the electronic processor, a signal entropy of each frame of the filtered signal;
 determining, via the electronic processor, an average signal of a first plurality of frames of the filtered signal, the first plurality of frames occurring at a beginning of the filtered signal;
 comparing, via the electronic processor, the signal entropy of each frame of the filtered signal to the average signal entropy; and
 determining, via the electronic processor, a first speech endpoint located in a first frame of the filtered signal based upon the comparison.

12. The method of claim 11, wherein the first audio signal is filtered using a band-limited filter.

13. The method of claim 12, wherein the band-limited filter has a lower limit of 250 Hertz and an upper limit of 6000 Hertz.

14. The method of claim 11, wherein the first frame occurs after the first plurality of frames of the filtered signal.

15. The method of claim 11, further comprising determining, via the electronic processor, a second speech endpoint in a second frame of the filtered signal, the second frame occurring later in the filtered signal than the first frame.

16. The method of claim 15, wherein the first speech endpoint is a beginning point of speech and the second speech endpoint is an ending point of speech.

17. The method of claim 15, wherein the second speech endpoint is determined when a predetermined number of frames after the second frame have a signal entropy below an offset threshold.

18. The method of claim 17, wherein the offset threshold is determined based upon the average signal entropy and a weight parameter.

19. The method of claim 11, wherein the first speech endpoint is determined when a predetermined number of frames after the first frame have a signal entropy greater than an onset threshold.

20. The method of claim 19, wherein the onset threshold is determined based upon the average signal entropy and a weight parameter.

* * * * *